Patented June 13, 1944

2,351,444

UNITED STATES PATENT OFFICE 2,351,444

METHOD OF TREATING CASTOR AND SIMILAR OILS

Hoke S. Miller, Stamford, Conn., assignor to Air Reduction Company, Incorporated, New York, N. Y., a corporation of New York No Drawing. Application May 14, 1942, Serial No. 443,019

6 Claims. (Cl. 260—405.5)

This invention relates to the modification of non-drying oils to afford oils having marked drying properties.

Drying oils such as linseed oil are used extensively in paints and printing inks, in the manufacture of linoleum, in the synthetic resin industry and for numerous other useful purposes. The characteristic of such oils is the amount of "unsaturation" or double bonded carbon linkages present in the oil. The "iodine value" determined by experimental procedure (Hanus method) is the mathematical means of expressing the degree of unsaturation. Linseed oil, an excellent drying oil, has an iodine value of from 175 to 202.

The material treated in the method as hereinafter described is a hydroxylated fat or fatty acid, preferably of the ricinoleic series, the acids of which have the general formula $C_nH_{2n-2}O_3$. The acids of this series include ricinoleic acid, isoricinoleic acid, ricinelaidic acid, ricinic acid and quince oil acid. Instead of the acids themselves, the glyceride esters of such acids, that is, the corresponding fats, may be employed. The preferred starting material is castor oil, which contains a substantial proportion of ricinolein, the simple triglyceride of ricinoleic acid.

It is the object of the present invention to afford a simple and effective method of modifying non-drying oils having at least one hydroxyl group and at least one unsaturated carbon linkage such as castor oil to afford a higher iodine value, with the result that the oil acquires drying properties and may be utilized for the purposes for which drying oils are adapted.

Other objects and advantages of the invention will be apparent as it is better understood by reference to the following specification, in which the preferred embodiments of the invention are described, it being understood that the description is merely by way of example of the general application of the procedure to non-drying oils.

Castor oil is a glyceride of a mono hydroxy unsaturated carboxylic acid containing one double bond. The oil is classified as non-drying, that is, a film exposed to the atmosphere will not dry and harden in the characteristic fashion of linseed oil. By dehydration, the elements of water are removed from the oil and a second double bond is produced. This change modifies the oil and results in an iodine value of for example 140 to 160. The modified oil has excellent drying characteristics. Other vegetable non-drying oils may be similarly modified by the procedure hereinafter described.

I have discovered that dehydration of vegetable oils may be effected most efficiently to increase the iodine value by heating the oil with a suitable catalyst, either at atmospheric pressure or under pressure below atmospheric (partial vacuum) to temperatures of from 150° to 300° C., and preferably between 200° and 260° C. The time of heating may vary widely, but usually from 10 to 60 minutes is sufficient. After completion of the reaction, the catalyst may be removed from the oil by filtration or otherwise.

Oxygen should be excluded during the reaction because it tends to increase the color of the oil and may increase the acid number (free acid). It is desirable to use an inert gas, preferably nitrogen, to agitate the mixture of oil and catalyst, to ensure the absence of oxygen and to reduce the possibility of side reactions. Carbon dioxide or other inert gas may be employed in place of nitrogen. The details of agitation and protection of the oil undergoing treatment are not critical, and any suitable measures may be employed in the practical application of the invention. Such measures will depend largely on the nature of the apparatus employed, and any suitable equipment adapted for the handling of oil may be used, including agitating and filtering apparatus well known in the art.

A satisfactory catalyst for the dehydration of vegetable oils consists of a mixture of alumina and silica in the form of a gel. The gel, after being dried, has unpredictable catalytic properties for the improvement of vegetable oils in respect to the iodine value, which can be increased readily to the point where the oils have satisfactory drying characteristics. Such a catalyst may be used continuously over long periods of time, and the reaction can be effected without introducing undesirable side reactions if proper precautions are taken in handling the material.

The improved catalyst may be prepared by reacting a solution of sodium silicate with a suitable acid in the presence of a soluble salt of aluminum. In this manner the gel is produced and is subsequently dried to afford a catalyst suitable for use in the procedure. As an example of the method of preparing the catalyst, I may dilute 156 cc. of commercial sodium silicate solution with 1400 cc. of water. To this solution is added 550 cc. of normal solution of HNO₃, after which another solution containing 31 grams of Al(NO₃)₃.9H₂O is added. There should be a slight excess of nitric acid. After the gel is formed, it is washed until the wash water gives no test for nitrates. Thereafter the gel is air-dried at room temperature for about 24 hours, then at 80° C. for about 24 hours. The resulting catalyst is mixed in suitable proportions with the oil undergoing treatment. A catalyst prepared in the manner described will ordinarily contain about 2% of Al₂O₃.

It will be understood that the foregoing example is merely illustrative. The proportions of silica and alumina in the catalyst may be varied over a wide range, and the exact proportions are not critical. Furthermore, the procedure as described is subject to numerous variations which will readily occur to the chemist, and the quantities used will depend upon the total amount of catalyst to be prepared.

I have discovered, moreover, that thoria may be substituted for alumina in the catalyst, in which case a compound of thorium is substituted for the compound of aluminum in preparing the catalyst. The proportions, as in the case of alumina, are not critical. I have used from a few per cent up to about ten per cent thorium oxide in the catalyst and have obtained satisfactory results. Undoubtedly much greater amounts of thorium oxide may be used, if desired.

It has also been found that catalysts containing alumina or thoria combined with silica may be mounted upon a suitable support such as pumice or other materials ordinarily employed as carriers for catalysts, provided that the carrier itself has no adverse effect upon the reaction. In this manner an economy may be effected in the preparation of the catalyst, and greater mechanical strength may be obtained by using such carriers.

In carrying out the invention, the oil to be treated is mixed with the catalyst in suitable proportions and the mixture is heated in a convenient container to the desired temperature. The container may be equipped to operate at atmospheric pressure or under a reduced pressure. Inlet and outlet conduits should be provided so that a stream of nitrogen or other inert gas may be passed through the container. If the gas is used for agitation, it will, of course, be introduced under a slight pressure and beneath the surface of the mass. However, the mass may be agitated otherwise, in which event the inert gas merely maintains an atmosphere free from oxygen. Any water or other volatile matter produced by the reaction is conducted from the container and through a suitable condenser. If a reduced pressure is to be maintained, a vacuum pump may be connected to the condenser outlet. As already indicated, the apparatus employed is not a part of the invention, since suitable equipment is readily available and consequently the apparatus need not be illustrated and described in detail. When the reaction has been completed, the catalyst is separated from the oil, as, for example, by filtration. The oil will be found to have an iodine value sufficiently high to afford the desired drying characteristic. The size of the catalyst particles has some effect upon the reaction, the increase in iodine value being more marked with decreasing size of the catalyst particles. However, the question of size is not critical, as is shown by the following tests which are the result of the treatment of the same oil employing 20% by weight of catalyst at temperatures of from 210° to 220° C.

| Catalyst size (screen mesh) | Iodine value |
| --- | --- |
| 20 | 120 |
| 40 | 131 |
| 60–100 | 146 |
| 200 | 163 |

As examples of the application of the invention, the following will indicate suitable conditions for the successful practice of the procedure.

Example I 200 grams of castor oil having an iodine value of 86 were heated with agitation in an atmosphere of nitrogen in the presence of 20 grams of a catalyst consisting of a gel of silica and alumina (100 mesh) at 210–240° C. for 20 minutes. 11 cc. of water were obtained in the distillate. The catalyst was removed by filtration and the dehydrated oil was found to have an iodine value of 169.

Example II 200 grams of castor oil having an iodine value of 86 were heated with agitation in an atmosphere of nitrogen in the presence of 10 grams of a catalyst consisting of a gel of silica and alumina (100 mesh) at 220–237° C. for 40 minutes. 10 cc. of water were collected in the distillate. After removal of the catalyst by filtration the iodine value of the dehydrated castor oil was 161.

Example III 100 grams of castor oil having an iodine value of 86 were heated in an atmosphere of nitrogen with 10 grams of a catalyst consisting of a gel of silica and alumina (200 mesh) at 200–205° C. for 30 minutes at a reduced pressure of about 10 mm. of mercury. 3 cc. of water were collected. The catalyst was removed by filtration and the dehydrated castor oil was found to have an iodine value of 161.

Example IV 100 grams of castor oil having an iodine value of 86 and 20 grams of a catalyst consisting of a gel of silica and thoria (60–100 mesh) were heated with agitation in a current of nitrogen for 30 minutes at 245–256° C. 2½ cc. of water were collected. After removal of the catalyst by filtration, the dehydrated oil was found to have an increased iodine value.

Corresponding tests employing as a catalyst both silica gel and alumina separately have demonstrated that neither of these materials has the desired catalytic properties to effect substantial improvement in the oil by increasing its iodine value. It was readily demonstrated that a gel consisting of silica and alumina or thoria is capable of effecting results which otherwise are unobtainable.

Various changes may be made in the details of procedure and in the proportions of the constituents in the catalyst as well as in the method of operation and the apparatus used without departing from the invention or sacrificing any of the advantages thereof.

I claim:

1. The method of increasing the iodine value of non-drying vegetable oils having at least one hydroxyl group and at least one unsaturated carbon linkage, which comprises heating the oil with a catalyst consisting of a gel composed of silica and an oxide of one of a group of elements consisting of aluminum and thorium.

2. The method of increasing the iodine value of non-drying vegetable oils having at least one hydroxyl group and at least one unsaturated carbon linkage, which comprises heating the oil with a catalyst consisting of a gel composed of silica and an oxide of one of a group of elements consisting of aluminum and thorium to a temperature between 150° and 300° C.

3. The method of increasing the iodine value of non-drying vegetable oils having at least one hydroxyl group and at least one unsaturated carbon linkage, which comprises heating the oil with a catalyst consisting of a gel composed of silica and an oxide of one of a group of elements consisting of aluminum and thorium to a temperature between 200° and 260° C.

4. The method of increasing the iodine value of castor oil which comprises heating the oil with a catalyst consisting of a gel composed of silica and an oxide of one of a group of elements consisting of aluminum and thorium.

5. The method of increasing the iodine value of castor oil which comprises heating the oil with a catalyst consisting of a gel composed of silica and an oxide of one of a group of elements consisting of aluminum and thorium to a temperature between 150° and 300° C.

6. The method of increasing the iodine value of castor oil which comprises heating the oil with a catalyst consisting of a gel composed of silica and an oxide of one of a group of elements consisting of aluminum and thorium to a temperature between 200° and 260° C.

HOKE S. MILLER.